United States Patent Office 3,395,952
Patented Aug. 6, 1968

3,395,952
BEARING AND THE LIKE CARRIER MEANS FOR MOVABLE MEMBERS
Paul C. F. Deffrenne, Geneva, Switzerland, assignor to Mecanorga S.A., Geneva, Switzerland
Filed Jan. 10, 1965, Ser. No. 519,778
Claims priority, application Switzerland, Feb. 8, 1965, 1,660/65
6 Claims. (Cl. 308—122)

ABSTRACT OF THE DISCLOSURE

Carrier means for a movable member which includes a support provided with pressure chambers facing the periphery of the movable member, and a circuit of fluid under pressure feeding the pressure chambers to urge the movable member into a predetermined position with reference to the stationary member with a clearance therebetween. The circuit is controlled by a pneumatic system including a supply of compressed air independent of said fluid circuit. The flow of compressed air between cooperating upstream and downstream nozzles acts on a distributor in accordance with the spacing between the downstream nozzle and the movable member to thereby urge the distributor into a position for which the movable member is returned to its predetermined position.

---

Figure 1:
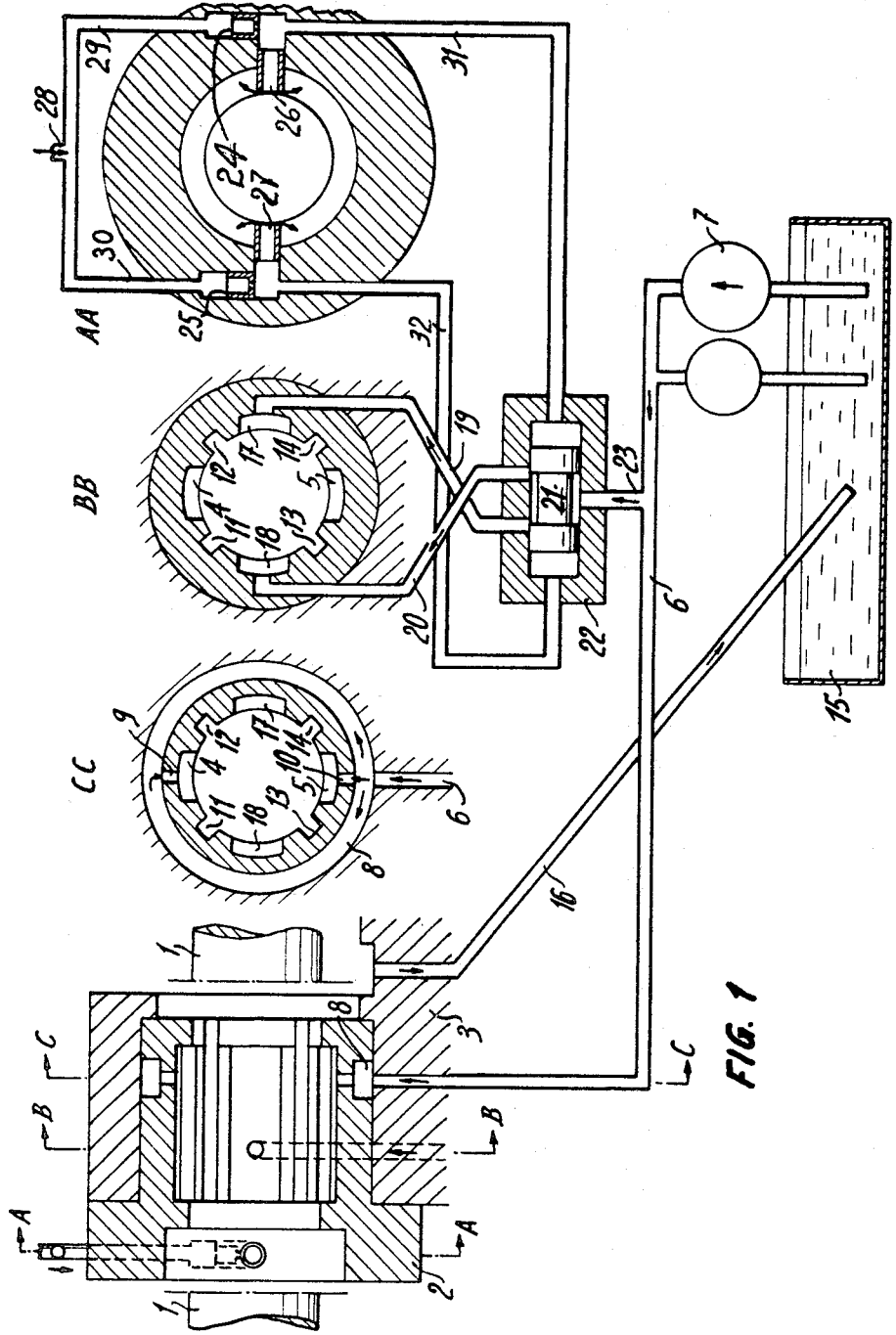

The present invention has for its object a bearing or the like carrier means for a movable member wherein the clearance provided between two members of which one is adapted to move with reference to the other, is fed with compressed fluid in a manner such that the two members cannot engage each other. However, the pressure of the fluid in such a case is defined by the position of the movable member with reference to the stationary member and consequently said position varies as a function of the load to which the movable member is subjected.

A certain improvement has been brought to said drawback by the invention disclosed by the Societe d'Etudes et d'Exploitation du Palier Fluide (SEEPF) in their French Patent No. 1,040,241, dated July 31, 1951. The principle of said invention consists chiefly in associating with a normal fluid bearing provided at the outset with a plurality of pressure areas formed in the stationary member, distributed round the periphery of the rotary member and fed with compressed fluid, auxiliary chambers, said witness chambers formed also in the stationary member but outside the above-mentioned pressure areas.

Each witness chamber is itself fed with compressed fluid through a throttled passage and the fluid is exhausted through the clearance appearing between the rotary member and the wall limiting the witness chamber. Any transient shifting of the rotary member with reference to a predetermined position under the action of a modification of the load, produces thus a modification in the fluid pressure inside the witness chamber. Now, this last-mentioned pressure acts in its turn on the movable member of a distributor of which the position controls on the one hand the circuit feeding the main pressure area corresponding thereto while on the other hand it can find its balance only when the rotary member has returned into a predetermined position. Under such conditions, a modification of the external load produces in succession the following phenomena: a transient shifting of the rotary member, a modification in the fluid pressure inside the witness chamber, a shifting of the movable section of the distributor and a modification in the fluid pressure in the main pressure area which continues until the antagonistic stress corresponding thereto reaches a value sufficient for it to produce a shifting of the rotary member in a direction opposed to its original movement, while finally when the rotary member has returned into its original predetermined position, the movable section of the distributor remains in a balanced position such that the fluid pressure in the main pressure area balances the modified value of the external load.

It appears however clearly from the disclosure contained in said prior French Patent No. 1,040,241 that the main pressure areas and the witness chambers are fed by a single common supply of compressed fluid, which feature shows a very serious drawback.

As a matter of fact, the accuracy with which the shaft or the like moving member may be held in a predetermined position, depends chiefly on the control of said position provided by a measuring device constituted, in said prior French patent, by a stream of compressed fluid flowing between two ports constituted on the upstream side by a nozzle and on the downstream side by the clearance extant between the shaft and the walls of the witness chamber.

However, the conventional system, which is frequently resorted to in practice, can never be based, if a sufficient accuracy is required, on the use of a liquid, since the laws governing the flow of a liquid, are considerably influenced by external reagents, and it requires the use of air as a measuring fluid. If, as in the case of said prior French patent, only a single supply of pressure is available, the measuring fluid is, of necessity, the same as that which supports the movable member. Now, in the large majority of the applications of the invention disclosed in said French patent, the supporting fluid is constituted by a liquid and this is so much true that all the examples disclosed in said prior patent refer only to such a possibility and all describe, without any exception, liquid-recovering tanks provided with an apparent liquid level. In other words, the invention disclosed in said prior French patent cannot lead, in most cases, to anymore than the execution of arrangements showing no accuracy, which cuts out in practice their major interest.

Furthermore, the fact of using the same supply of compressed fluid for ensuring the control of the position of the shaft and for supporting it, leads to a risk of interference between the two circuits of compressed fluid, which is detrimental to the proper operation of the apparatus.

The present invention has for its object to cut out these various drawbacks and it covers an arrangement carrying a movable member, chiefly a bearing, which arrangement includes a stationary member arranged coaxially with reference to said movable member with an annular clearance therebetween and a plurality of pressure chambers provided in the stationary member, spaced uniformly round the periphery of said movable member and fed by a compressed fluid; according to the invention, a pneumatic system controls permanently the location of the movable member with reference to the stationary member and operating chiefly through the agency of at least one stream of compressed air flowing between two ports, of which the upstream port is constituted by an input nozzle while the other, downstream port, is constituted by the clearance between the periphery of a nozzle rigid with the stationary member and the surface registering with the last-mentioned nozzle on the movable member, said pneumatic control system adjusting the admission, into the main compression chambers formed in the stationary member, of a fluid under pressure passing out of a supply different from that feeding the pneumatic control system and feeding said fluid through a distributor the movable element of which cannot find its balance until the movable member has returned into a predetermined position.

Said system is applicable, of course, to all the cases disclosed by the SEEPF Company in their French Patent No. 1,040,241 and also to the arrangements provided with slideways and sliders in which the movable member is constituted by the slider and the stationary member by the slideways. By way of example, the invention may be applied to a bearing for a shaft provided with self-centering means operating in a single plane, which corresponds to the case where the outer force acting on the shaft, is exerted in a constant direction. This arrangement will now be described in detail, reference being made to the accompanying drawings, wherein:

FIG. 1 is an axial cross-section associated with three transverse cross-sections through lines A—A, B—B and C—C drawn on said axial cross-section, showing such a bearing provided with means adjusting the position of the cooperating shaft through the agency of two control circuits leading to two nozzles located at the opposite ends of a common diameter which is parallel with the constant general direction along which it is assumed that an outer force is exerted.

Figure 2:
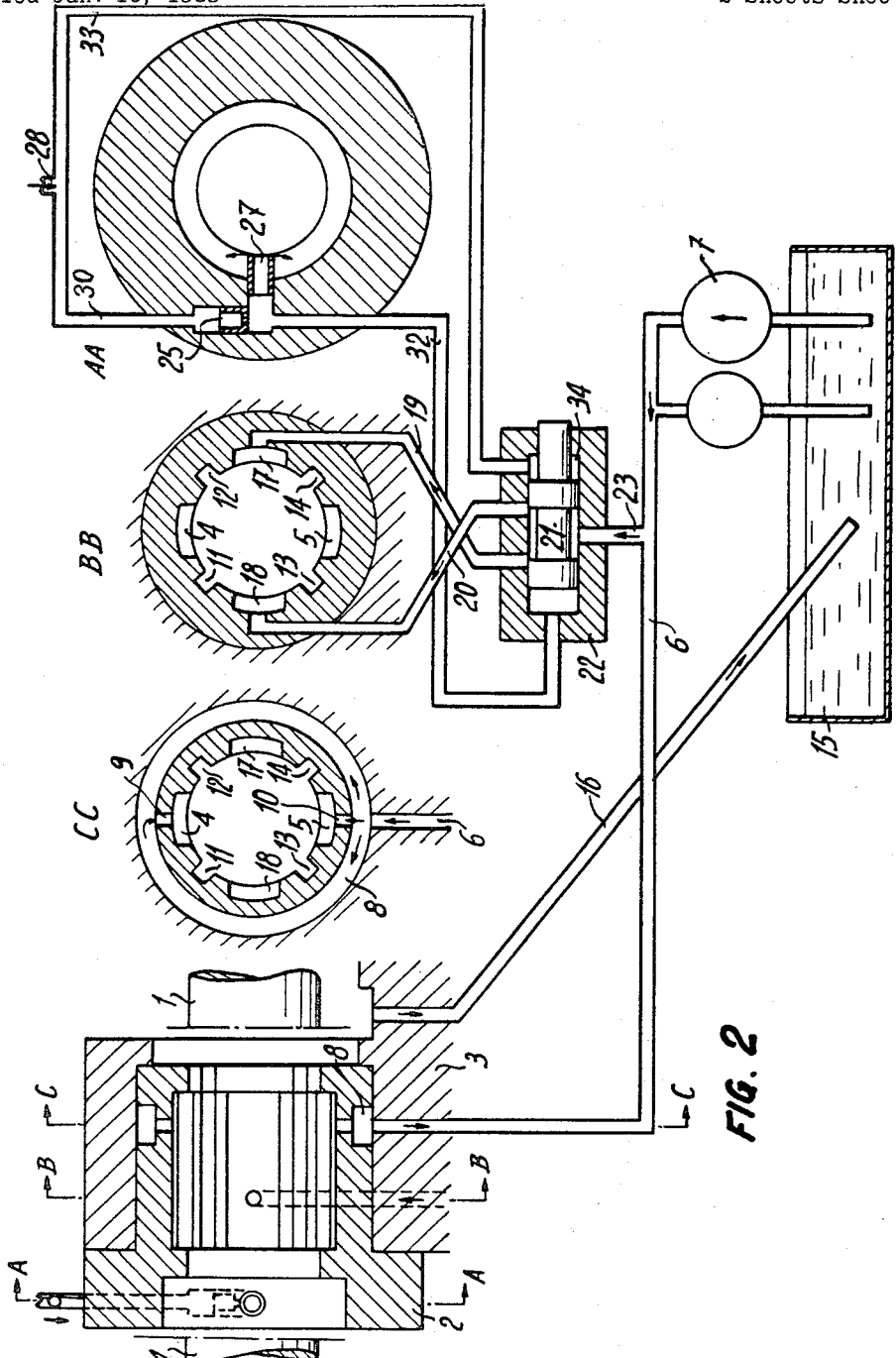

FIG. 2 is also an axial cross-section, associated with three transverse cross-sections along lines A—A, B—B and C—C, of a modified embodiment of the bearing, which embodiment includes only one control circuit leading to a single nozzle.

Turning first to FIG. 1, 1 designates a shaft revolving in one of its bearings 2 which is itself rigidly secured to a frame 3. The bearing 2 is, generally speaking, of the normal fluid bearing type; in other words, it includes four thrust or pressure chambers provided in the bearing 2 and fed with a compressed fluid. The two pressure chambers 4 and 5 (shown in the cross-section C—C) which ensure the stability of the shaft 1 in a direction perpendicular to that in which it is desired to obtain a self-centering of the shaft, are fed conventionally with fluid through a pipe 6 connected directly with the pump 7 and opening into an annular groove 8 leading to throttled passages shown respectively at 9 and 10; the output of said fluid is provided through the clearance appearing between the ribs defining the sides of the chambers 4 and 5 respectively and the shaft 1, the fluid being exhausted into longitudinal grooves designated respectively by 11, 12 and 13, 14 and thence into the vat 15 through the channel 16. Said stabilizing system prevents merely, by reason of the flow of compressed fluid inside the chambers 4 and 5, any direct contact between the bearing 2 and the shaft 1.

In contradistinction, the two other pressure chambers 17 and 18 are adapted to ensure the self-centering of the shaft 1 in the desired direction perpendicular to the direction referred to hereinabove and they are fed by pipes designated respectively by 19, 20 in the cross-section B—B and the cross-sectional area of which depends on the position of a slide valve 21 adapted to slide inside a distributor body 22. Said distributor 22 is fed by the pump 7 through the pipe 23 forming a branch of the pipe 6. The return of the fluid into the vat 15 is ensured by the above-mentioned longitudinal grooves, designated by 12, 14 and 11, 13 cooperating respectively with the pipes 19 and 20, and the output channel 16. When the slide valve 21 is in its medial position, the cross-sections of the pipes 19 and 20 are equal and any shifting of the slide valve 21 leads to an increase in pressure in one of the two chambers 17 or 18 and to a reduction in pressure in the other chamber.

The position of equilibrium of the slide valve 21 which defines the pressure of the fluid in the chambers 17 and 18 is controlled in its turn by a pneumatic control system incorporated with the bearing 2 and controlling permanently the location of the shaft 1 with reference to the bearing 2, at the opposite ends of a diameter parallel with the direction along which it is desired to ensure the self-centering of the shaft as shown in the cross-section A—A. Each of the two control circuits is constituted by a stream of air flowing between two ports, to wit an upstream port constituted by an input nozzle, 24 or 25 according to the case, and on the downstream side, the varying clearance between the edge of an output nozzle 26 or 27 and the shaft 1. The cross-sections of the two nozzles 24 and 25 are equal and the same is the case for the peripheries of the output nozzles 26 and 27. The two circuits are fed by a common supply of compressed air 28 through the agency of the corresponding pipes 29 and 30. Under such conditions, the pressure is the same in both circuits when the shaft is at equal distances from the two output nozzles 26, 27 and any shifting of the shaft produces a disturbance in the balance between said pressures. Said pressures act through the agency of the corresponding pipes 31 and 32 on the opposite sides of the slide valve 21.

The operation of said arrangement is as follows:

When no outer load acts on the shaft 1, the antagonistic stresses exerted by the compressed fluids carried inside the chambers 17 and 18 balance each other, which implies that the slide valve 21 is in its medial position. Since, on the other hand, the slide valve 21 should be itself in equilibrium, the air pressures acting on its opposite surfaces should be equal, which can be obtained only when the shaft 1 is in its central position.

When, starting from this condition of equilibrium, an outer force acts on the shaft 1, for instance from the right hand side towards the left hand side when considering the cross-section A—A of FIG. 1, the shaft 1 begins moving in the direction of said force, the air pressure increases inside the pipe 32 and it decreases in the pipe 31, which has for its consequence a shifting of the slide valve 21 towards the right hand side. The cross-sectional area of the pipe 20 and consequently the pressure inside the chamber 18 increases. In contradistinction, the cross-sectional area of the pipe 19 and consequently the pressure inside the chamber 17 are reduced. Under the action of the corresponding antagonistic stresses, the shaft moves towards the right hand side, that is it returns towards its original position. The balance will be restored when, on the one hand, the position of the slide valve 21 is such that the difference between the antagonistic stresses exerted by the fluids in the chambers 18 and 17 balances the outer load, and when, on the other hand, the slide valve 21 is in its turn in equilibrium, that is when the shaft 1 has returned accurately into its central position.

The conditions of operation of the pneumatic control system are considerably improved when the air flows at sonic speed, that is either on the upstream side through the nozzles 24 and 25 or on the downstream side between the output nozzles 26 and 27 and the shaft or again both on the upstream and on the downstream sides, which may be obtained by selecting suitably the pressure of the supply of air as also the shape and cross-section of the nozzles 24 and 25.

FIG. 2 illustrates a modified and simplified embodiment with reference to FIG. 1, which modified embodiment includes the same essential parts as the embodiment illustrated in FIG. 1, said parts carrying the same reference numbers in both cases. In contradistinction, according to said simplified embodiment, the position of the shaft 1 is controlled by a single air circuit 30, 25–27 which is identical with either of the circuits described with reference to FIG. 1, the air pressure being exerted on one side of the slide valve 21 through the agency of the pipe 32. On the other surface of the slide valve 21, the cross-sectional area of which is smaller than that of the first-mentioned side, a constant pressure of air is exerted through the pipe 33 the value of which constant pressure is equal to that of the common supply of air 28. The fact that the same supply feeds, on the one hand, the control circuit 30, 25 and 27 and on the other hand, the chamber 34 in the slide valve 21, the balance of the slide valve 21 can be obtained only when the shaft 1 lies at a predetermined unvarying distance of the output nozzle 27.

Except for this modification, the operation of the embodiment illustrated in FIG. 2 is exactly similar to that described for the embodiment illustrated in FIG. 1.

As already mentioned, the present invention is applicable to various cases and has been described hereinabove as applied to a bearing since such an application is of a particular interest and easy to describe. The invention may, for instance, be applied as well to the keeping of a piston in a predetermined axial position inside a cylinder. It may also be applied to the accurate guiding of a slider with reference to its slideway and it is in principle applicable each time a member movable with reference to a stationary member, is to assume a predetermined position with reference to said stationary member whatever may be the forces acting on said movable member.

I claim:

1. Carrier means for a movable member, comprising a support for said movable member provided with pressure chambers facing the periphery of said movable member, a circuit of fluid under pressure feeding said pressure chambers to urge the movable member into a predetermined position with reference to the stationary member with a clearance therebetween and a pneumatic system including a supply of compressed air independent of said fluid circuit, at least one upstream nozzle fed by said supply, a circuit fed by each upstream nozzle, a distributor controlled by the circuits fed by the nozzles and occupying a position controlling the flow of fluid under pressure towards the pressure chambers to make said fluid urge back the movable member into a predetermined position with reference to the stationary member, a downstream nozzle fed by the circuit fed by each upstream nozzle and opening in registry with the periphery of the movable member, the flow of compressed air between the cooperating upstream and downstream nozzles acting on the distributor in accordance with the spacing between the downstream nozzle and the movable member to thereby urge the distributor into a position for which the movable member is returned into its predetermined position.

2. Carrier means as claimed in claim 1, wherein the movable member being a part of revolution, a single upstream nozzle feeds a single circuit and a single downstream nozzle open into registry with the periphery of said part of revolution.

3. Carrier means as claimed in claim 1, wherein the movable member being a part of revolution, two upstream nozzles feed two circuits and two downstream nozzles opening in registry with two diametrically opposed points of the part of revolution, the flow of compressed air in one of the circuits acting on the distributor and consequently on the movable member in a direction opposed to that in which the flow in the other circuit acts.

4. Carrier means as claimed in claim 1, wherein the supply feeds compressed air at a pressure such that the flow of air through the upstream nozzles is performed at sonic speed.

5. Carrier means as claimed in claim 1, wherein the supply feeds compressed air at a pressure such that the flow of air through the downstream nozzles is performed at sonic speed.

6. Carrier means as claimed in claim 1, wherein the supply feeds compressed air at a pressure such and the shape and cross-section of the upstream nozzle are such that the flow of air through the upstream and downstream nozzles is performed at sonic speed.

References Cited
UNITED STATES PATENTS 2,692,803  10/1954  Gerard _____ 308—9

MARTIN P. SCHWADRON, *Primary Examiner.*

FRANK SUSKO, *Assistant Examiner.*